E. T. MALLOY.
CASTER.
APPLICATION FILED OCT. 6, 1916.
1,233,093.
Patented July 10, 1917.
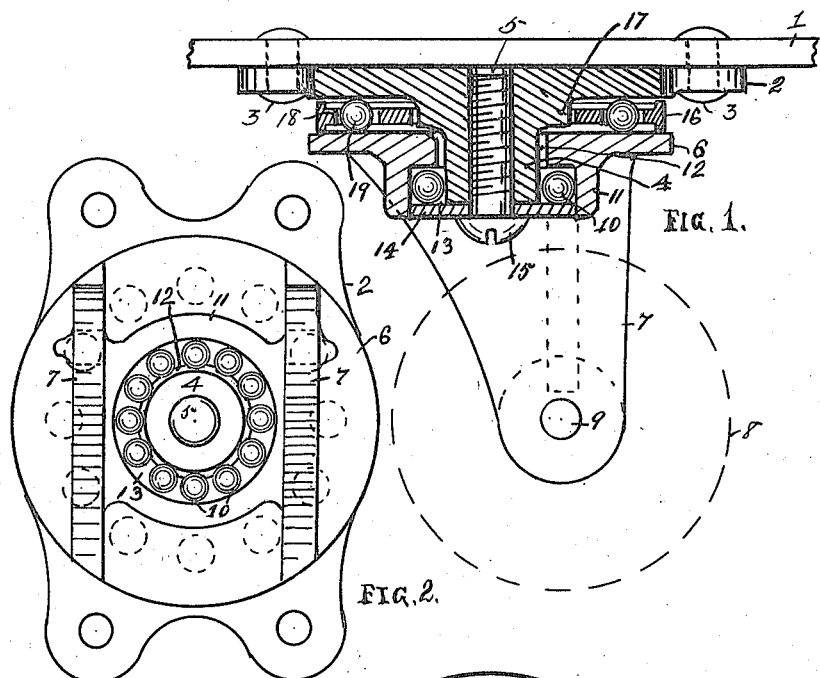
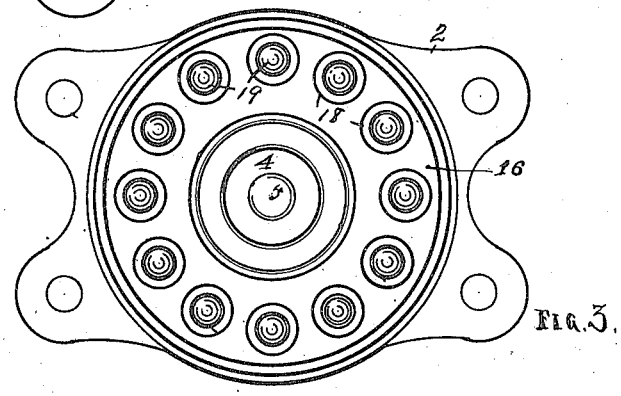
Witnesses,
J. R. Allendorf
J. J. Carr.
Edward T. Malloy, Inventor.
By Robert S. Carr.
atty.

UNITED STATES PATENT OFFICE.

EDWARD T. MALLOY, OF HAMILTON, OHIO.

CASTER.

1,233,093.    Specification of Letters Patent.    Patented July 10, 1917.

Application filed October 6, 1916. Serial No. 124,183.

*To all whom it may concern:*

Be it known that I, EDWARD T. MALLOY, a citizen of the United States, residing at Hamilton, Ohio, have invented a new and useful Improvement in Casters, of which the following is a specification.

My invention relates to casters of the class adapted to be used for heavy warehouse trucks having metal bottoms or for other suitable purposes, and the objects of my improvements are to provide means for the removal or replacing of the housings on stems which are permanently secured to the truck; to provide separate anti-friction bearings for resisting the respective vertical and horizontal thrusts; to provide races for contacting with the anti-friction balls at diametrically opposite points on their surface for increasing the sensitiveness of their action, and to provide simple and durable construction and assemblage of the various members for securing facility of operation and efficiency of action. These objects may be attained in the following described manner as illustrated in the accompanying drawings, in which:—

Figure 1 is a vertical diametrical section with the floor wheel removed of a caster embodying my improvements; Fig. 2 an inverted plan with the ball retaining plate removed, and Fig. 3 an inverted plan of the top plate showing the cage with the balls in proper position in relation to the stem.

In the drawings, 1 represents portions of the metal bottom of a truck, 2 the top plate of a caster permanently attached thereto by means of rivets 3. Said plate is formed with a plane under surface and with the depending stem 4 having the vertical opening 5 therethrough. The housing consists of a circular plate 6 formed with a plane top surface and with the depending legs 7 for engaging with the floor wheels 8 by means of the axle 9 in the usual manner.

Said plate 6 is also formed with the depending boss 11 having an axial opening 12 therethrough which is counterbored at its lower end to form the annular ball chamber 13. The circular ball retaining plate 14 may be movably secured within the chamber 13 and removably secured to the stem 4 by means of the screw 15 as shown in Fig. 1, for retaining the anti-friction balls 10 within the chamber 13 and also for preventing the removal of the stem 4 from the axial opening 12.

The circular ball cage 16 is formed with an axial opening adapted to loosely encircle the enlarged base portion 17 of the stem 4 and with the ball chambers 18 in a concentric circle to contain the anti-friction balls 19 and maintain them approximately within a concentric path between the top plate and the housing as shown in Fig. 1.

The anti-friction balls of both the plate and the stem bearings are arranged to contact only at diametrically opposite points in their surface with the opposing plane surfaces, which reduces their frictional action to a minimum amount.

In operation, the top bearing serves only to resist the vertical thrust and is limited in its horizontal movement by the stem bearing. Each bearing is arranged to resist the thrust for which it is intended without any interference from the other. This is due to the absence of grooves for the balls in the opposing surfaces.

Should a housing become broken it may be removed and replaced by another by the removal of the screw and ball retaining plate. The caster consists of so few members assembled to coact so perfectly and with such little frictional resistance that it commends itself to the manufacturer and also to the trade, and merits protection.

Having fully described my improvements, what I claim as my invention and desire to secure by Letters Patent of the United States is:—

A caster comprising a housing formed with a circular plate having a plane top surface and with a depending boss, said plate and boss being formed with an axial opening terminating at its lower end in an internal annular ball chamber, a top plate formed with a plane lower surface and with a circular stem depending within said opening and terminating within said annular chamber, anti-friction balls encircling the stem within the chamber for sustaining the side thrust thereon, a retaining plate for said balls removably secured on the end of the stem, anti-friction balls interposed between said plates for sustaining the downward thrust on the housing and having diametrically opposite points thereof in contact with the plane surface of the respective plates, and a ball retaining cage loosely encircling the stem between the plates for directing the balls in a circular path near the periphery of the housing plate and maintaining them in predetermined distance relation to each other.

E. T. MALLOY.

Witnesses:
R. S. CARR,
C. F. AUTENEN.